United States Patent
Zinenko et al.

(10) Patent No.: US 9,471,709 B1
(45) Date of Patent: Oct. 18, 2016

(54) PROCESSING AUTOCOMPLETE SUGGESTIONS

(71) Applicant: Google Inc., Mountain View, CA (US)

(72) Inventors: Dmitry Zinenko, Beer Sheva (IL); Costa Touma, Haifa (IL); Michael Herscovici, Haifa (IL)

(73) Assignee: Google Inc., Mountain View, CA (US)

( * ) Notice: Subject to any disclaimer, the term of this patent is extended or adjusted under 35 U.S.C. 154(b) by 196 days.

(21) Appl. No.: 14/263,611

(22) Filed: Apr. 28, 2014

Related U.S. Application Data

(63) Continuation of application No. 13/649,681, filed on Oct. 11, 2012, now Pat. No. 8,713,042.

(51) Int. Cl.
*G06F 7/00* (2006.01)
*G06F 17/30* (2006.01)
*G06F 3/14* (2006.01)
*G06F 3/00* (2006.01)
*G06F 3/048* (2013.01)

(52) U.S. Cl.
CPC ... *G06F 17/30973* (2013.01); *G06F 17/30522* (2013.01)

(58) Field of Classification Search
CPC .......... G06F 17/30861; G06F 17/30864; G06F 17/30973; G06F 17/30522; G06F 17/30964; G06F 17/30967; G06F 17/3097; G06F 17/30976

See application file for complete search history.

(56) References Cited

U.S. PATENT DOCUMENTS

| | | | |
|---|---|---|---|
| 7,849,080 B2 | 12/2010 | Chang et al. | |
| 7,949,647 B2 * | 5/2011 | Teran | G06F 17/30973 707/708 |
| 2006/0106769 A1 * | 5/2006 | Gibbs | G06F 17/276 707/3 |
| 2009/0094221 A1 | 4/2009 | Cameron et al. | |
| 2010/0010977 A1 * | 1/2010 | Choi | G06F 17/30864 707/E17.014 |
| 2012/0284293 A1 * | 11/2012 | Nierenberg | G06F 17/30654 707/766 |
| 2013/0151533 A1 | 6/2013 | Udupa et al. | |

* cited by examiner

*Primary Examiner* — James Trujillo
*Assistant Examiner* — Cheryl M Shechtman
(74) *Attorney, Agent, or Firm* — Middleton Reutlinger

(57) ABSTRACT

Methods and apparatus for processing autocomplete suggestions. Some implementations are directed to methods and apparatus for generating additional suggestions for provided multiple term autocomplete suggestions and determining additional suggestion scores for the additional suggestions. Like entries among the additional suggestions and the autocomplete suggestions may be identified and each similar grouping of the like entries combined into a consolidated entry. A combined consolidated score for each consolidated entry may be determined based on one or more of the additional suggestion scores and any of the autocomplete scores of the like entries combined into the consolidated entry.

23 Claims, 7 Drawing Sheets

| vacation | 4.0 |
|---|---|
| vacation destination | 3.6 |
| vampire stories | 3.5 |
| vacation search engines | 3.2 |
| vineyard in napa valley | 2.5 |
| video editing software | 2.1 |
| video | 2.0 |
| vineyard vacation in tuscany italy | 1.0 |

FIG. 3A

| vacation | 4.0 |
|---|---|
| vacation | 3.6 |
| vacation destination | 3.6 |
| vampire | 3.5 |
| vampire stories | 3.5 |
| vacation | 3.2 |
| vacation search | 3.2 |
| vacation search engines | 3.2 |
| vineyard | 2.5 |
| vineyard in | 2.5 |
| vineyard in napa | 2.5 |
| video | 2.1 |
| video editing | 2.1 |
| video editing software | 2.1 |
| video | 2.0 |
| vineyard | 1.0 |
| vineyard vacation | 1.0 |
| vineyard vacation in | 1.0 |

FIG. 3B

| vacation | 10.8 |
|---|---|
| video | 4.1 |
| vacation destination | 3.6 |
| vampire | 3.5 |
| vampire stories | 3.5 |
| vineyard | 3.5 |
| vacation search | 3.2 |
| vacation search engines | 3.2 |
| vineyard in | 2.5 |
| vineyard in napa | 2.5 |
| video editing | 2.1 |
| video editing software | 2.1 |
| vineyard vacation | 1.0 |
| vineyard vacation in | 1.0 |

FIG. 3C

PROCESSING AUTOCOMPLETE SUGGESTIONS

CROSS-REFERENCE TO RELATED APPLICATION

This application is a continuation under 35 U.S.C. §120 of U.S. patent application Ser. No. 13/649,681, now U.S. Pat. No. 8,713,042, filed Oct. 11, 2012, and entitled "Processing Autocomplete Suggestions", which is incorporated by reference herein in its entirety.

BACKGROUND

This specification is directed generally to processing autocomplete suggestions. Entering text and other input using computing devices can be time consuming. Also, erroneous keystrokes on a physical or virtual keyboard may need to be corrected, further complicating the entry of input. Autocomplete suggestions may be provided to assist in the entering of text to a computing device.

For example, one or more autocomplete suggestions may be provided to a user as the user is typing a query for use in an information retrieval system, an e-mail application, and/or other application. The user may choose one of the autocomplete suggestions to utilize as part of a query and/or to utilize as the basis for a query (e.g., by modifying, adding to, and/or subtracting from the selected autocomplete suggestion).

SUMMARY

The present disclosure is directed to methods and apparatus for processing autocomplete suggestions. For example, some implementations are directed to methods and apparatus for determining autocomplete suggestions and/or determining scores for autocomplete suggestions. Also, for example, some implementations are directed to methods and apparatus for determining which autocomplete suggestions to provide in response to a query and/or for sorting autocomplete suggestions based at least in part on scores of the autocomplete suggestions. Autocomplete suggestions and/or associated data of autocomplete suggestions may be provided to one or more users and/or stored for later retrieval.

In some implementations a computer implemented method may be provided that includes the steps of: identifying a plurality of autocomplete suggestions and corresponding autocomplete scores for a query; identifying multiple term autocomplete suggestions of the autocomplete suggestions, each of the multiple term autocomplete suggestions having a first term and one or more subsequent terms; generating additional suggestions for the multiple term autocomplete suggestions, the additional suggestions for one or more of the autocomplete suggestions including the first term of the autocomplete suggestion and also including the first term combined with at least one contiguous of the subsequent terms of the autocomplete suggestion; determining additional suggestion scores for one or more of the additional suggestions, wherein the additional suggestion score for an additional suggestion is determined from the autocomplete score of the multiple term autocomplete suggestion used to generate the additional suggestion; identifying one or more of the autocomplete suggestions and one or more of the additional suggestions as potential autocomplete suggestions; identifying groupings of like entries among the additional suggestions and the autocomplete suggestions; combining the groupings of like entries into a consolidated entry for each of the groupings; and determining a combined consolidated score for each consolidated entry based on one or more of the additional suggestion scores and any of the autocomplete scores of the like entries combined into the consolidated entry.

This method and other implementations of technology disclosed herein may each optionally include one or more of the following features.

The method may further include sorting the potential autocomplete suggestions based on any respective of the autocomplete scores, the additional suggestions scores, and each said consolidated score. The method may further include selecting a longer suggestion of the potential autocomplete suggestions for display instead of a shorter suggestion of the potential autocomplete suggestions when the longer suggestion is within a threshold value of a respective one of the consolidated score and the additional suggestion score of the shorter suggestion, the longer suggestion having same the first term of the shorter suggestion. The longer suggestion may be selected for display instead of the shorter suggestion when the longer suggestion is responsible for at least a threshold percentage of the respective one of the consolidated score and the additional suggestion score of the shorter suggestion.

The method may further include omitting any of the autocomplete suggestions from the potential autocomplete suggestions that have a display length that is greater than a maximum display length.

The step of determining the consolidated score of each consolidated entry may include summing the additional suggestion scores and any autocomplete scores of the like entries consolidated into the consolidated entry.

The method may further include determining a subset of the potential autocomplete suggestions in response to the query based on the autocomplete scores and the consolidated scores of the potential autocomplete suggestions.

The method may further include selecting a display group of the potential autocomplete suggestions in response to the query based on the autocomplete scores and the consolidated scores. The method may further include selecting a longer suggestion of the potential suggestions for the display group when the longer suggestion is within a threshold value of a respective one of the consolidated score and the additional suggestions score of a shorter suggestion of the potential suggestions, the longer suggestion having the same said first term as the shorter suggestion. Whether a given suggestion of the potential suggestions is included in the display group may be dependent on the length of the given suggestion. The step of selecting the display group may be based on the length of the first term in each of the potential suggestions.

The method may further include selecting a second display group of the potential autocomplete suggestions in response to the query to display after the first display group. Different selection criteria may be utilized in selecting the second display group than utilized in selecting the first display group.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

Particular implementations of the subject matter described herein analyze one or more aspects of autocomplete suggestions to create additional autocomplete suggestions, to determine scores for autocomplete suggestions, and/or to determine which autocomplete suggestions to provide in response to a request for autocomplete suggestions. These one or more additional autocomplete suggestions, autocomplete scores, and/or autocomplete suggestion determinations represent new aspects of autocomplete suggestions that may be derived from one or more supplied autocomplete suggestions based on a submitted query. The autocomplete suggestions may be utilized by one or more applications to provide improved query suggestions to users of the applications.

It should be appreciated that all combinations of the foregoing concepts and additional concepts discussed in greater detail herein are contemplated as being part of the inventive subject matter disclosed herein. For example, all combinations of claimed subject matter appearing at the end of this disclosure are contemplated as being part of the inventive subject matter disclosed herein.

BRIEF DESCRIPTION OF THE DRAWINGS

FIG. 3A is an example listing of autocomplete suggestions and corresponding autocomplete scores for a query.

FIG. 3B is a listing of autocomplete suggestions of FIG. 3A, generated additional autocomplete suggestions, and corresponding autocomplete scores.

FIG. 3C is a listing of the autocomplete suggestions of FIG. 3B, with groups of like entries and their corresponding scores consolidated.

DETAILED DESCRIPTION

Figure 1:
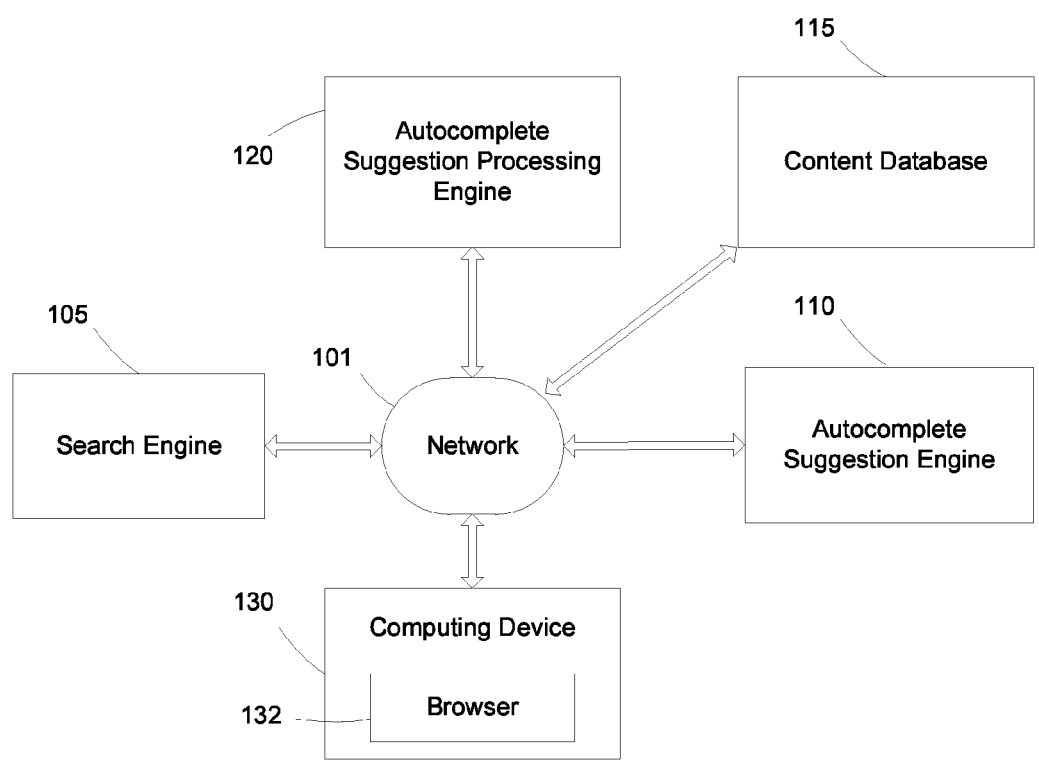
FIG. 1 is a block diagram of an example environment in which an implementation of a method of processing autocomplete suggestions may be implemented.

Referring to FIG. 1, a block diagram is illustrated of an example environment in which implementations of a method of processing autocomplete suggestions may be implemented. The environment includes computing device 130, search engine 105, content database 115, autocomplete suggestion engine 110, and autocomplete suggestion processing engine 120. The environment also includes a communication network 101 that enables communication between various components of the environment.

In some implementations a user may interact with the search engine 105 through a client computing device 130. The computing device 130 may be, for example, a desktop computer, a laptop computer, a cellular phone, a smartphone, a personal digital assistant (PDA), a tablet computer, a navigation system, or another computing device. The computing device 130 and the search engine 105 each include memory for storage of data and software applications, a processor for accessing data and executing applications, and components that facilitate communication over a communication network 101. The operations performed by the client computing device 130 and/or the search engine 105 may be distributed across multiple computer systems.

The computing device 130 executes one or more applications, such as web browsers (e.g., web browser 132), that enable the user to formulate completed queries and submit completed queries to the search engine 105. In some implementations completed queries may be submitted directly to the search engine 105 from the computing device 130. In some implementations completed queries may be submitted from the autocomplete suggestion engine 110 and/or the autocomplete processing engine 120 to the search engine 105.

The search engine 105 receives a completed query and executes the completed query against a search engine content database (e.g., implemented in content database 115) of available documents such as web pages, images, text documents, and/or multimedia. The search engine 105 identifies content which matches the submitted query and responds by generating search results that are transmitted to one or more devices in a form that is useful for the devices. For example, search results may be transmitted to the computing device 130 in a form that can be presented to the user. For example, in response to a query from the computing device 130, the search engine 105 may transmit a plurality of search results to be displayed in the web browser 132 that is executing on the computing device 130. The content database 115 may include one or more storage mediums. For example, in some implementations the content database 115 may include multiple computer servers each containing one or more storage mediums.

The one or more applications executing on the computing device 130 also provide partial queries being formulated by users, before the users have indicated completion of the queries. The applications may be, for example, a web browser, a toolbar running in a web browser, an e-mail application, a text-messaging application, and/or a search client running on the computing device 130. In some implementations the applications provide each character of a query as it is typed or otherwise entered by the user. In some implementations the applications provide multiple characters at a time, optionally following a pause by the user between character entries.

A partial query is a query formulated by a user prior to an indication by the user that the query is a completed query. In some implementations a user may indicate a completed query by entering a carriage return and/or other character. In some implementations a user may indicate a completed query by selecting a search button or other submission button in a user interface presented to the user. In some implementations a user may indicate a completed query by speaking a command in a speech user interface. In some implementations a user may indicate a completed query by pausing more than a predetermined amount of time during entering of the query. One of ordinary skill in the art, having had the benefit of the present disclosure, will recognize and appreciate that other forms of providing a partial query and/or indicating a completed query may additionally and/or alternatively be utilized.

In response to a partial query entered by a user, the computing device 130 may facilitate entry of user input by providing suggested inputs to the user. For example, when the user enters one or more characters, the computing device 130 can provide autocomplete suggestions that are selected using the one or more characters. In some implementations the autocomplete suggestions may be provided to the computing device 130 by autocomplete suggestion engine 110 and/or autocomplete suggestion processing engine 120. The autocomplete suggestions that are provided may include words or phrases that include the one or more characters that were entered by the user. For example, complete words or extended phrases can be suggested for partial words or partial phrases that a user has entered (e.g., using a physical or virtual keyboard). The autocomplete suggestions can also include words or phrases that are similar to (e.g., synonyms or spelling corrections of) the user input. The user can interact with (e.g., tap, click, or otherwise affirmatively select) one of the provided autocomplete suggestions to enter the text of the selected autocomplete suggestion.

The computing device 130 may permit multiple autocomplete suggestions to be included in a single search query (e.g., prior to a user indication that the search query is complete). For example, a user interface of the computing device 130 may allow a user to select multiple autocomplete suggestions in succession, allowing the user to build a search query one word or one phrase at a time. A phrase can include one or more words. When the user selects multiple autocomplete suggestions, the query can include each of the selected autocomplete selections in the sequence that they were selected. After each selection of an autocomplete suggestion, the computing device 130 configures the user interface to receive additional query content rather than indicating a completed query in response to user selection of an autocomplete suggestion.

As an example, when a user selects an autocomplete suggestion, the selected autocomplete suggestion is added to the partial query, forming an extended query. The computing device 130 then presents new autocomplete suggestions for the extended query. By selecting one of the new autocomplete suggestions, the user can add it to the extended query, and can continue to add additional autocomplete suggestions (or other input) until the user indicates that the query is complete.

In some implementations, the computing device 130 does not initiate a search using the query in response to a selection of an autocomplete suggestion. Rather, the computing device 130 can wait to initiate a search until query completion data is received. The query completion data can indicate that the user has finished composing a complete query. The query completion data can be received as an interaction with a user interface element that occurs separate from the selection of an autocomplete suggestion.

In some implementations where the computing device 130 permits queries to be composed in stages (e.g., through multiple user selections of autocomplete suggestions), the autocomplete suggestions can be components of queries or query fragments rather than complete queries. For example, each autocomplete suggestion can be a likely next word or next phrase of a query being composed, rather than a suggestion of a complete query. As a result, provided autocomplete suggestions may be shorter than many complete queries, and the number of autocomplete suggestions that fit in a display area can be greater than the number of complete queries that would fit in the display area. When the user changes the query (e.g., through keyboard input or selection of an autocomplete suggestion), the autocomplete suggestions may be refreshed, exposing the user to many different combinations of query terms during the query building process.

The autocomplete suggestions may be displayed to a user in a user interface of the computing device 130. For example, the autocomplete suggestions may be displayed within a cascaded drop down menu of the search field of an application, such as a web browser executing on the computing device 130, as the user is typing the query. Also, for example, the autocomplete suggestions may be displayed in a plurality of separately selectable cells arranged in one or more rows or columns in a user interface as the user is typing the query. In some implementations one or more search results for a query suggestion may also optionally be displayed as the user is typing the query.

In some implementations, in response to a partial query being entered at computing device 130, the search engine 105 receives the partial query and forwards the partial query to the autocomplete suggestion engine 110. In some implementations, in response to a partial query being entered at computing device 130, the one or more applications executing on the computing device 130 may optionally directly forward the partial query to the autocomplete suggestion engine 110. For example, in some implementations the browser 132 may directly forward the partial query to the autocomplete suggestion engine 110. The autocomplete suggestion engine 110 includes memory for storage of data and software applications, a processor for accessing data and executing applications, and components that facilitate communication over the communication network 101. The autocomplete suggestion engine 110 may then match the submitted partial query to one or more of a plurality of autocomplete suggestions that are an appropriate match to the partial query. In some implementations the autocomplete suggestions may represent potential completed queries that may be provided to a user to enable the user to choose one of the autocomplete suggestions as a basis for utilization in a search or other information retrieval application.

In some implementations the autocomplete suggestions may include those determined based on a list of past user queries, a list of automatically generated queries, and/or real time automatically generated queries. For example, the autocomplete suggestion engine 110 may use prefix based matching to identify query suggestions from a list of past user queries. Any listing of past user queries and/or past automatically generated queries may optionally be stored in an autocomplete suggestion content database such as content database 115, for potential utilization as query suggestions and/or as a basis for query suggestions. These autocomplete suggestions provided by the query suggestion engine 110 represent words or phrases that a user may want to include in addition to or instead of the partial queries actually being typed.

In some implementations the content database 115 may include one or more autocomplete suggestions that have been determined, scored, and/or sorted according to one or more methods and/or apparatus described herein. For example, the content database 115 may include one or more autocomplete suggestions that have been determined, scored, and/or sorted according to methods of FIGS. 2, 4, and/or 5. Such autocomplete suggestions may be provided to a user. In some implementations the autocomplete suggestion engine 110 may provide the autocomplete suggestions to a user via the search engine 105, the autocomplete suggestion processing engine 120, and/or to the computing device 130 directly.

In some implementations the autocomplete suggestion engine 110 may provide the autocomplete suggestions to autocomplete suggestion processing engine 120. The autocomplete suggestion processing engine 120 may determine additional autocomplete suggestions; determine scores for one or more of the provided autocomplete suggestions and/or one or more of the additional autocomplete suggestions; determine which autocomplete suggestions to provide to a user; and/or sort one or more of the provided autocomplete suggestions and/or one or more of the additional autocomplete suggestions. In some implementations the autocomplete suggestion processing engine 120 may perform one or more steps of the methods of FIGS. 2, 4, and/or 5.

For example, the autocomplete suggestion processing engine 120 may determine additional autocomplete suggestions by omitting at least one term after one or more term boundary of one or more of the received autocomplete suggestions that have at least one term boundary. A term boundary is an identifiable boundary in a string of text that denotes separate terms are provided on either side of the term boundary. For example, a term boundary may include a space (" "), a punctuation mark (e.g., ".", ",", ";", "|"), and/or other identifiable demarcation between text. For example, "example.com" has a period that represents a term boundary. An additional autocomplete suggestion ("example") may be determined by omitting the term boundary and the term after the term boundary. The determination of the additional autocomplete suggestions may include one or more aspects of the method of FIG. 2 such as step 205.

Also, for example, the autocomplete suggestion processing engine 120 may determine scores for the autocomplete suggestions and/or the additional autocomplete suggestions. For example, the autocomplete suggestions provided to the autocomplete suggestion processing engine 120 may be provided with associated autocomplete scores. Scores for the additional autocomplete suggestions and/or new scores for some of the provided autocomplete suggestions may be determined based at least in part on the provided autocomplete scores. The determination of scores for the autocomplete suggestions may include one or more aspects of the method of FIG. 2 such as steps 210, 215, and/or 220.

Also, for example, the autocomplete suggestion processing engine 120 may sort one or more of the provided autocomplete suggestions and/or one or more of the additional autocomplete suggestions. For example, the autocomplete suggestion processing engine 120 may sort one or more of the provided autocomplete suggestions and/or one or more of the additional autocomplete suggestions based at least in part on scores assigned to each of such autocomplete suggestions. Also, for example, the sorting may additionally and/or alternatively be based on other factors such as the number of terms in the autocomplete suggestions, the length of term(s) in the autocomplete suggestions, and/or display parameters of the computing device 130. In some implementations sorting of the autocomplete suggestions may be utilized to determine which autocomplete suggestions are provided to a user and/or in which order the autocomplete suggestions are displayed to the user. The sorting of the autocomplete suggestions may include one or more aspects of the method of FIGS. 2, 4, and/or 5.

In some implementations the autocomplete suggestion processing engine 120 may transmit the determined additional autocomplete suggestions, determined scores for one or more of the autocomplete suggestions, and/or the sorting of the autocomplete suggestions for storage in a database such as content database 115. In some implementations stored data may optionally be associated with a corresponding partial query in the database for future retrieval in response to a future autocomplete suggestion request for the partial query. In some implementations the autocomplete suggestion engine 110 may supply existing autocomplete suggestions for a given partial query to autocomplete suggestion processing engine 120 to enable autocomplete suggestion processing engine 120 to determine additional autocomplete suggestions and score and/or sort such data for storage in a database for future retrieval. In some implementations the autocomplete suggestion engine 110 may supply autocomplete suggestions for a real time query to enable autocomplete suggestion processing engine 120 to determine additional autocomplete suggestions and score and/or sort such data for providing as autocomplete suggestions in response to the real time query. In some implementations the autocomplete suggestion engine 110 may supply autocomplete suggestions for a real time query to enable autocomplete suggestion processing engine 120 to determine which of a plurality of supplied autocomplete suggestions to display in response to the real time query.

In some implementations the autocomplete suggestion processing engine 120 provides autocomplete suggestions to a user. In some implementations the autocomplete suggestion processing engine 120 may provide the autocomplete suggestions to a user via the search engine 105, the autocomplete suggestion engine 110, the query suggestion annotation engine 125, and/or to the computing device 130 directly.

In some implementations the search engine 105 and/or the computing device 130 may optionally additionally or alternatively provide a completed query to the autocomplete suggestion engine 110. A completed query is a query that the user has indicated is complete. The autocomplete suggestion engine 110 may then match the completed query to one or more autocomplete suggestions to determine one or more autocomplete suggestions for the user's completed query. The autocomplete suggestion engine 110 and/or the autocomplete suggestions processing engine 120 then provides these autocomplete suggestions to the user. In some implementations the autocomplete suggestions may be provided to a user via the search engine 105, the autocomplete suggestion processing engine 120, and/or to the computing device 130 directly. The autocomplete suggestions may, for example, be embedded within a search results web page to be displayed in an application, such as the web browser 132, as potential further search options.

The communication network 101 facilitates communication between the various components in the environment. In some implementations the communication network 101 may include the Internet, one or more intranets, and/or one or more bus subsystems. The communication network 101 may optionally utilize one or more standard communications technologies, protocols, and/or inter-process communication techniques.

Many other configurations are possible having more or less components than the environment shown in FIG. 1. For example, although the autocomplete suggestion processing engine 120 and the autocomplete suggestion engine 110 are each illustrated alone in FIG. 1, it is understood that the autocomplete suggestion processing engine 120 and/or the autocomplete suggestion engine 110 may optionally be combined with one another and/or with one or more of the search engine 105 and/or the computing device 130 in some implementations.

Figure 2:
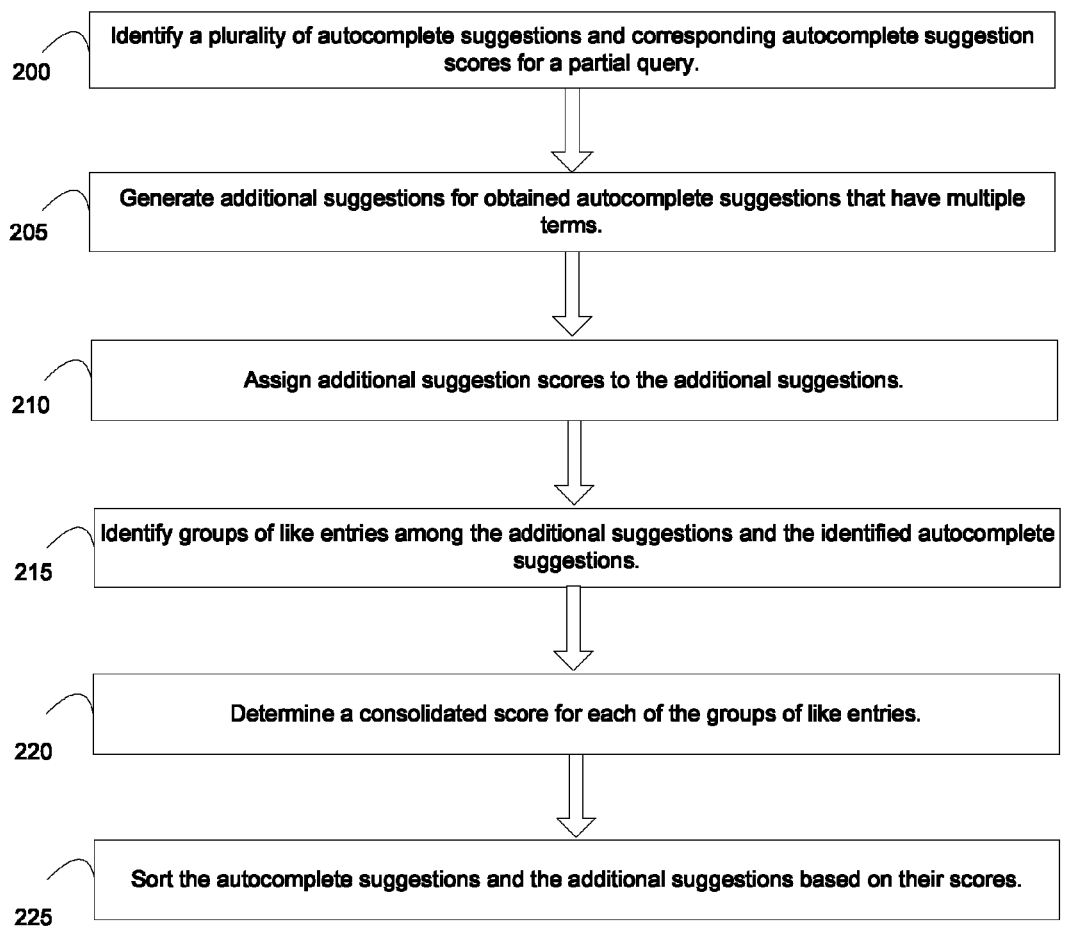
FIG. 2 is a flow chart illustrating an example method of determining autocomplete suggestions, determining scores for autocomplete suggestions, and sorting the autocomplete suggestions.

Referring to FIG. 2, a flow chart illustrating steps of determining autocomplete suggestions, determining scores for autocomplete suggestions, and sorting the autocomplete suggestions is illustrated. Other implementations may perform the steps in a different order, omit certain steps, and/or perform different and/or additional steps than those illustrated in FIG. 2. For convenience, aspects of FIG. 2 will be described with reference to a system of one or more computers that perform the process. The system may include, for example, the autocomplete suggestion engine 110 and/or the autocomplete suggestion processing engine 120 of FIG. 1.

At step 200 a plurality of autocomplete suggestions and corresponding scores for a query are identified. For example, for a partial query of "v", the autocomplete suggestions and corresponding scores of FIG. 3A may be obtained. The autocomplete suggestions of FIG. 3A are illustrated in the left column. The autocomplete suggestions all contain "v" as the prefix and contain additional text to form a complete word or phrase starting with "v". The autocomplete scores of FIG. 3A are illustrated in the right column, each in the same row as its corresponding autocomplete suggestion. In some implementations the autocomplete suggestions may be transmitted to the autocomplete suggestion processing engine 120 from the autocomplete suggestion engine 110 via communications network 101. The autocomplete suggestions may be transmitted in response to a user on computing device 130 entering a partial query and the computing device 130 transmitting the partial query to the autocomplete suggestion engine 110.

In some implementations the identified autocomplete suggestions may include N autocomplete suggestions for the partial query. For example, in some implementations the identified autocomplete suggestions may be the N most popular autocomplete suggestions for the partial query. Also, for example, in some implementations the identified autocomplete suggestions may be the N most popular queries that begin with the partial query. N may be selected to provide desired diversity of data, while maintaining desired performance. N may be adjusted as desired and may optionally be dependent on the parameters of the partial query. For example, in some implementations N may decrease as the length of the partial query increases.

At step 205, additional suggestions are generated for identified autocomplete suggestions that have multiple terms. In some implementations the autocomplete suggestion processing engine 120 may generate the additional suggestions. In some implementations the additional suggestions are generated for autocomplete suggestions that have multiple terms and at least one term boundary by omitting at least one term after the term boundary. A term boundary is an identifiable boundary in a string of text that denotes separate terms are provided on either side of the boundary. For example, "jump over the moon" has three spaces that each represents a term boundary. Three additional autocomplete suggestions ("jump over the"; "jump over"; and "jump") may be determined by individually identifying each term boundary and omitting the term boundary and any terms after the selected term boundary. The additional autocomplete suggestions may include the multiple term autocomplete suggestions to the first term and the first term combined with at least one contiguous of the subsequent terms. In some implementations, when the partial query includes multiple terms, the multiple terms may be identified as part of the first term when generating additional suggestions and/or determining for which autocomplete suggestions to generate additional suggestions. As an example, for a partial query of "vacation sea" autocomplete suggestions of "vacation search engines" and "vacation seattle" may be identified. The multiple term autocomplete suggestion of "vacation search engines" to the first term may be "vacation search" and "vacation seattle" may be identified as only having a single term.

In some implementations additional suggestions may only be generated if they are less than a certain length and/or are less than a certain number of terms. For example, in some implementations additional suggestions are only created up to a length of M characters. In some implementations the variable M may be based on the usable width of the user interface of the computing device requesting the autocomplete suggestions. For example, a user interface may only be capable of displaying 25 characters and additional suggestions will not be created that are greater than 25 characters in length.

FIG. 3B illustrates a listing of the autocomplete suggestions of FIG. 3A and generated additional autocomplete suggestions for the autocomplete suggestions of FIG. 3A. Each of the multiple term autocomplete suggestions of FIG. 3A may broken down to the first term and, where more than two terms are provided, to the first term combined with at least one contiguous of the subsequent terms to generate the additional autocomplete suggestions. The term "vacation" of FIG. 3A is a single term and does not have any term boundaries. Accordingly, no additional terms are created for "vacation." The term "video" of FIG. 3A is also a single term and does not have any term boundaries. Accordingly, no additional terms are created for "video." The phrase "vacation destination" has two terms, one term boundary, and one additional suggestion ("vacation") is created for that autocomplete suggestion. The phrase "vacation search engines" has three terms, two term boundaries, and two additional suggestions ("vacation" and "vacation search") are created for that autocomplete suggestion. The phrase "video editing software" has three terms, two term boundaries and two additional suggestions ("video" and "video editing") are created for that autocomplete suggestion.

The phrase "vineyard in napa valley" has four terms, three term boundaries, and three additional suggestions ("vineyard", "vineyard in", and "vineyard in napa") are created for that autocomplete suggestion. In the implementation of FIG. 3B, autocomplete suggestions that are more than three terms in length are omitted from the listing. Accordingly, "vineyard in napa valley" is not included in the listing of FIG. 3B although the additional suggestions of "vineyard", "vineyard in", and "vineyard in napa" are included. In some implementations "napa valley" may be identified as a single term since those two terms frequently neighbor each other. In some of those implementations a term boundary would not be identified between "napa" and "valley" and only two additional suggestions would be created. The phrase "vineyard vacation in tuscany italy" has four term boundaries and three additional suggestions ("vineyard", "vineyard vacation", and "vineyard vacation in") are created for that autocomplete suggestion. In the implementation of FIG. 3B, autocomplete suggestions that are more than three terms in length are omitted from the listing. Accordingly, "vineyard vacation in tuscany" and "vineyard vacation in tuscany italy" are not included in the listing of FIG. 3B although the additional suggestions of "vineyard", "vineyard vacation", and "vineyard vacation in" are included.

Some implementations may omit autocomplete suggestions having more or fewer terms. Some implementations may omit autocomplete suggestions that exceed a certain length. In some implementations, which autocomplete suggestions are omitted may be based on how many characters and/or terms may be displayed in a user interface in which the autocomplete suggestions may be displayed.

In some implementations one or more canonicalization rules may optionally be applied to one or more terms in provided autocomplete suggestions and/or in additional autocomplete suggestions to modify and/or omit certain words. For example, stemming of words, phrasing of words, removal of low frequency words, and/or removal of stop words may be utilized. Rules that prevent additional suggestions from being created at certain boundaries may also be implemented. For example, a listing of multiple word single terms such as "new york" and "thank you" may be utilized to identify those multiple words as single terms and prevent additional suggestions from being created by omitting word(s) after the boundary between those words. For example, the space between "new" and "york" may not be identified as a term boundary since "new york" is viewed as a single term. Also, for example, a listing of stop terms and/or other terms may be utilized to prevent additional suggestions from being created at the term boundary between those terms and terms that follow. For example, additional suggestions may be prevented from being created at the term boundary following terms such as "and" and "of".

At step 210 additional suggestion scores are assigned to the additional suggestions generated in step 205. In some implementations the autocomplete suggestion processing engine 120 may assign the additional suggestion scores. In some implementations an additional suggestion score may be based on the corresponding autocomplete score of the provided autocomplete suggestion from which the additional suggestion originated. For example, the additional suggestion score for each of the additional suggestions in FIG. 3B is the same as the score for the autocomplete suggestion from which the additional suggestion originated. As an example, the additional suggestions of "video" and "video editing" have the same score (2.1) as the score provided with "video editing software". Also, the additional suggestions "vineyard", "vineyard vacation", and "vineyard vacation in" have the same score (1.0) as the score provided with "vineyard vacation in tuscany italy". In some implementations one or more additional suggestion scores may otherwise be based in part on the corresponding autocomplete score of the provided autocomplete suggestion from which the additional suggestion originated. For example, the additional suggestion score may be a percentage of the corresponding autocomplete score. Also, for example, the additional suggestion score may be based on the corresponding autocomplete score and on the amount of characters and/or terms in the additional suggestion.

At step 215, groups of like entries are identified among the additional suggestions and the autocomplete suggestions. In some implementations the autocomplete suggestion processing engine 120 may identify the groups of like entries. In some implementations like entries may be identified and consolidated into a single entry. For example, in FIG. 3B the term "vacation" appears three separate times, representing the provided autocomplete suggestion "vacation" and additional suggestions for provided autocomplete suggestions "vacation destination" and "vacation search engines." These three instances of the term "vacation" may be identified and, optionally consolidated into a single entry as illustrated by the single entry of vacation in FIG. 3C. The like entries of "vineyard" and "video" in FIG. 3B are also consolidated into single entries in FIG. 3C. Although only single term like entries are illustrated in FIG. 3B, identified like entries may include multiple terms in some implementations and/or in response to some queries. In some implementations one or more canonicalization rules may optionally be applied to one or more terms prior to identifying like entries. For example, stemming of terms, phrasing of terms, removal of low frequency terms, and/or removal of stop terms may be utilized.

At step 220, a consolidated score for each of the groups of like entries identified at step 215 is determined. In some implementations the autocomplete suggestion processing engine 120 may determine the consolidated score. In some implementations the consolidated score may be based on the scores associated with the individual autocomplete suggestions that were identified as a group of like entries. In some implementations the consolidated score may be the sum of the scores of the autocomplete suggestions (the additional autocomplete suggestions and any provided autocomplete suggestions) that were identified as a group of like entries. For example, the consolidated score of "10.8" for the term "vacation" in FIG. 3C is the sum of the individual scores for "vacation" in FIG. 3B ("4.0", "3.6", and "3.2"). Also, for example, the consolidated score of "3.5" for the term "vineyard" in FIG. 3C is the sum of the individual scores for "vineyard" in FIG. 3B ("1.0" and "2.5"). The consolidated score for "video" in FIG. 3C ("4.1") is also the sum of the individual scores for "video" in FIG. 3B ("2.0", and "2.1").

In some implementations one or more consolidated score may otherwise be based on the scores associated with the individual autocomplete suggestions that were identified as a group of like entries. For example, the consolidated score may be a percentage of the corresponding scores associated with the individual autocomplete suggestions. Also, for example, the consolidated score may be based on the corresponding autocomplete score and on the amount of characters and/or terms in the like entry of the group. In some implementations the scores for non-consolidated autocomplete suggestions (whether additional suggestions or originally provided) may be maintained per step 200 and/or step 210. In some implementations the scores for non-consolidated autocomplete suggestions (whether additional suggestions or originally provided) may otherwise be based on the scores assigned per step 200 and/or step 210.

At step 225, the autocomplete suggestions and the additional suggestions are optionally sorted based on their scores. For example, in some implementations the autocomplete suggestions and the additional suggestions may be sorted in descending order based on their scores as illustrated in FIG. 3C and identified as potential autocomplete suggestions. Also, for example, in some implementations the autocomplete suggestions and the additional suggestions may be sorted based on their scores to create a subset of potential autocomplete suggestions for providing to a user and/or for storage. For example, a subset of the ten highest scores may be created for providing to a user and/or for storing in a content database for future retrieval as potential autocomplete suggestions for a query. Also, for example, in some implementations the autocomplete suggestions and the additional suggestions may be sorted into one or more subsets according to one or more aspects of FIGS. 3 and/or 4 and stored and/or provided as potential autocomplete suggestions to provide for display on a computing device. In some implementations the autocomplete suggestion processing engine 120 may sort the autocomplete suggestions and the additional suggestions.

In some implementations the autocomplete suggestions and the additional suggestions may optionally be sorted based on additional and/or alternative factors. For example, the sorting may be based at least in part on frequency of query of the autocomplete suggestions. Also, for example, the sorting may be based at least in part on the number of terms in the autocomplete suggestions. Also, for example, the sorting may be based at least in part on the number of characters in the autocomplete suggestions. Also, for example, the sorting may be based at least in part on the display width of a display of a computing device to which the autocomplete suggestions will be provided.

Figure 4:
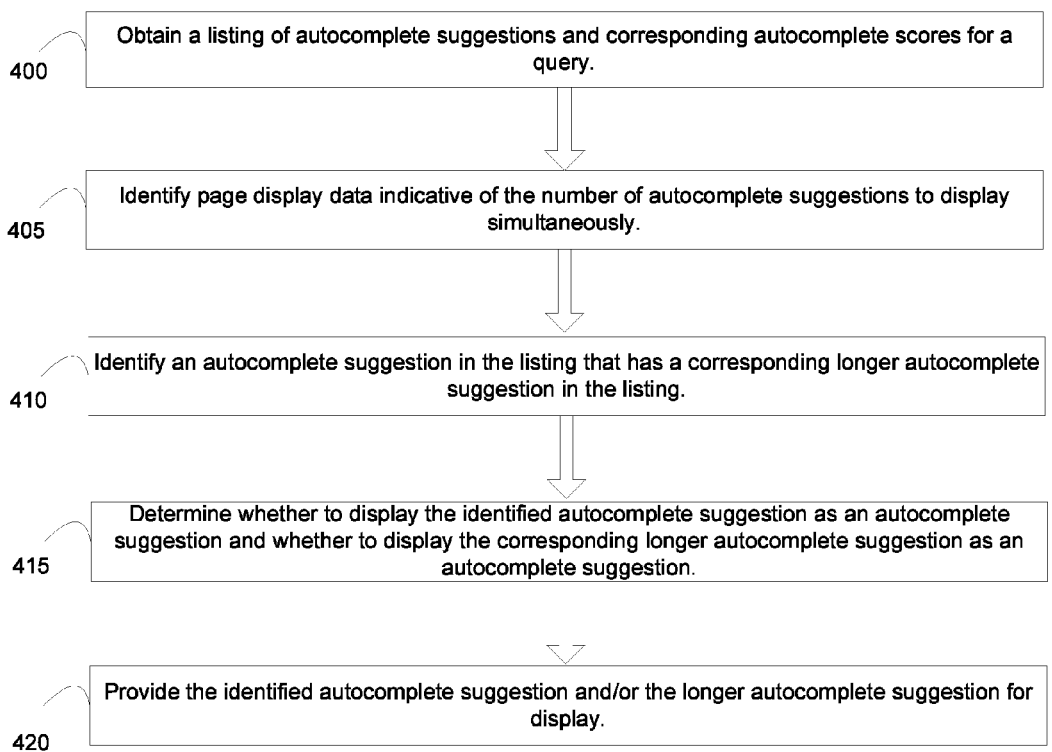
FIG. 4 is a flow chart illustrating an example method of determining which autocomplete suggestions to provide for display on a computing device.

Referring to FIG. 4, a flow chart illustrating steps of an example method of determining which autocomplete suggestions to provide for display on a computing device is illustrated. Other implementations may perform the steps in a different order, omit certain steps, and/or perform different and/or additional steps than those illustrated in FIG. 4. For convenience, aspects of FIG. 4 will be described with reference to a system of one or more computers that perform the process. The system may include, for example, the autocomplete suggestion processing engine 120 of FIG. 1. In some implementations the steps of FIG. 4 may share one or more common aspects with FIG. 2 such as step 200 and/or 225.

At step 400 a listing of autocomplete suggestions and corresponding autocomplete scores for a query are identified. In some implementations the identified autocomplete suggestions and scores may include additional suggestions and/or consolidated scores generated, for example, utilizing aspects of the method of FIG. 2. For example, for a partial query of "v", the autocomplete suggestions and corresponding scores of FIG. 3C may be received. The autocomplete suggestions of FIG. 3C are illustrated in the left column. The autocomplete scores of FIG. 3C are illustrated in the right column, each in the same row as its corresponding autocomplete suggestion. In some implementations the autocomplete suggestions may be transmitted to the autocomplete suggestion processing engine 120 from the autocomplete suggestion engine 110 and/or the content database 115 via communications network 101. The autocomplete suggestions may be transmitted in response to a user on computing device 130 entering a partial query and the computing device 130 transmitting the partial query to the autocomplete suggestion engine 110.

In some implementations the identified autocomplete suggestions may include N autocomplete suggestions for the query. For example, in some implementations the identified autocomplete suggestions may be the N most popular autocomplete suggestions for the query. Also, for example, in some implementations the identified autocomplete suggestions may be the N most popular queries that begin with the partial query. N may be selected to provide desired diversity of data, while maintaining desired performance. N may be adjusted as desired and may optionally be dependent on the parameters of the partial query. For example, in some implementations N may decrease as the length of the query increases. In some implementations step 400 FIG. 4 may share one or more common aspects with step 200 of FIG. 2.

At step 405 page display data indicative of the number of autocomplete suggestions to display simultaneously is identified. The page display data is indicative of the number of autocomplete suggestions that may be displayed simultaneously on an identified computing device such as computing device 130. In some implementations the computing device 130 may transmit the page display data to the autocomplete suggestion processing engine 120. The page display data may be dependent on the computing device and/or on the application executing on the computing device that is requesting autocompletion suggestions. For example, the screen size of a smart phone may cause the number of autocomplete suggestions that may be displayed simultaneously to be less than the number that may be displayed simultaneously on a larger screen such as a desktop computer screen. Page display data may include and/or be based on one or more factors such as screen size, resolution, parameters of the executing application, and/or screen orientation.

At step 410 an autocomplete suggestion in the listing provided at step 400 is identified that has a corresponding longer autocomplete suggestion in the listing. In some implementations the autocomplete suggestion processing engine 120 may identify the autocomplete suggestion that has a corresponding longer autocomplete suggestion in the listing. For example, in the listing of FIG. 3C, "video editing" is a longer autocomplete suggestion for "video". Also, for example, in the listing of FIG. 3C, "vineyard in", "vineyard in napa", "vineyard vacation", and "vineyard vacation in" are all longer autocomplete suggestions for "vineyard."

At step 415 it is determined whether to display the identified autocomplete suggestion as an autocomplete suggestion and whether to display the corresponding longer autocomplete suggestion as an autocomplete suggestion. In some implementations the autocomplete suggestion processing engine 120 may determine which autocomplete suggestions are selected to display. In some implementations which autocomplete suggestions are selected to display may be dependent on the scores of the identified autocomplete suggestion and the corresponding longer autocomplete suggestion. For example, in some implementations the corresponding longer suggestion may be displayed if the score of the longer autocomplete suggestion represents at least Y % of the score of the shorter autocomplete suggestion. As an example with Y %=25%, in FIG. 3C "video editing" is a corresponding longer autocomplete suggestion for "video" and the score for "video editing" is 2.1 and the score for "video" is 4.1. Since the score for "video editing" is more than 25% of the score of "video", then it may be determined that "video editing" should be displayed as an autocomplete suggestion. In some implementations when "video editing" is selected for display it may be selected for display instead of the shorter autocomplete suggestion "video". In some implementations "video editing" may be selected for display in addition to the shorter autocomplete suggestion "video". In some implementations the order of display of "video" and/or "video editing" may be based on corresponding scores thereof. In some implementations Y % may be from approximately 25% to approximately 33%. In some implementations Y % may be dependent on the length of the overridden prefix. In other words, Y % may be a value dependent on the length of the first term in each of the potential suggestions that is not wholly included in the query. As an example, for a query "v", each of the first terms in the autocomplete suggestions in FIG. 3C are an overridden prefix and not wholly included in the query. In some implementations Y % may increase as the length of the overridden prefix increases.

In some implementations which autocomplete suggestions are selected to display may additionally and/or alternatively be based on the ranking distance between the autocomplete suggestions. For example, in some implementations the corresponding longer autocomplete suggestion may only be displayed as an autocomplete suggestion if it is ranked less than X positions lower than the shorter identified autocomplete suggestion in a ranked list. As an example with X=5, in FIG. 3C "video editing" is a corresponding longer autocomplete suggestion for "video" and is ranked 9 positions lower than "video" in the ranked list of FIG. 3C. Since "video editing" is ranked greater than 5 positions from "video", then it may be determined that "video editing"

should not be displayed. If, on the other hand, "video editing" were ranked less than 5 positions from "video", then it may be determined that "video editing" should be displayed. In some implementations when "video editing" is selected for display it may be selected for display instead of the shorter autocomplete suggestion "video". For example, in some implementations the corresponding longer autocomplete suggestion may be displayed as an autocomplete suggestion instead of the shorter identified autocomplete suggestion if it is ranked less than X positions lower than the shorter identified autocomplete suggestion in a ranked list. In some implementations "video editing" may be selected for display in addition to the shorter autocomplete suggestion "video". In some implementations the order of display of "video" and/or "video editing" may be based on corresponding scores thereof. In some implementations X may be based on the number of autocomplete suggestions that may simultaneously be displayed to a user on a particular computing device.

In some implementations which autocomplete suggestions are selected to display may be based on the ranking distance between the autocomplete suggestions and the number of autocomplete suggestions that may simultaneously be displayed to a user on a computing device. For example, in some implementations the corresponding longer autocomplete suggestion may only be displayed (instead of or in addition to the shorter autocomplete suggestion) if it is ranked less than X*page positions lower than the shorter autocomplete suggestion in a ranked list, where "page" is based on the identified page display data of step 405. The "page" information may be received from a computing device requesting autocomplete suggestions. As an example with X=0.75, and page=6, in FIG. 3C "video editing" is a corresponding longer autocomplete suggestion for "video" and is ranked 9 positions lower than "video" in the ranked list of FIG. 3C. Since the "video editing" is ranked greater than 5 positions (rounded up from 4.5) from "video", then it may be determined that "video" should be displayed and "video editing" should not be displayed. In some implementations X may be from approximately 0.75 to approximately 1. In some implementations, displaying the shorter autocomplete suggestion instead of or in addition to the corresponding longer autocomplete suggestion if the longer autocomplete suggestion is ranked more than X positions lower than the shorter autocomplete suggestion in a ranked list, may ensure at least one of the shorter autocomplete suggestion and the longer autocomplete suggestion is presented to a user as an early presented autocomplete suggestion. In some implementations, if the shorter autocomplete suggestion is displayed on a page, then it may be determined that the corresponding longer autocomplete suggestion will not be displayed on a later page.

In some implementations which autocomplete suggestion is selected to display may be dependent on which page or set of autocomplete suggestions the user is viewing. For example, in some implementations a user may view multiple sets of autocomplete suggestions, with the first set being displayed together simultaneously and then additional autocomplete suggestions being displayed as one or more additional sets in response to a user action requesting additional autocomplete suggestions. In some implementations parameters may be adjusted to increase the prominence of longer autocomplete suggestions after the first set of autocomplete suggestions. For example, in some implementations Y % may be from approximately 25% to approximately 33% in determining the first set of autocomplete suggestions to display, then may be lowered (e.g., to approximately 10% to 20%) in determining the next set of autocomplete suggestions to display. Also, for example, in some implementations only multiple term autocomplete suggestions and/or autocomplete suggestions of at least a threshold number of characters may be displayed after the first set of autocomplete suggestions. In some implementations step 415 of FIG. 4 may share one or more common aspects with step 225 of FIG. 2.

At step 420 the identified autocomplete suggestion and/or the corresponding longer autocomplete suggestion are provided for display. In some implementations the autocomplete suggestion processing engine 120 may provide the autocomplete suggestion for display as an autocomplete suggestion. In some implementations the autocomplete suggestion may be provided to content database 115 for future display and/or to computing device 130 for display in response to a query being entered. In some implementations the identified autocomplete suggestion and/or the corresponding longer autocomplete suggestion determined at step 415 is selected to display simultaneously in combination with other of the autocomplete suggestions of the listing. How many other of the autocomplete suggestions of the listing are displayed may be dependent on the identified page display data of step 405. In some implementations determination of which of the other autocomplete suggestions to display may be based on similar parameters as those described in step 415. In some implementations other of the autocomplete suggestions of the listing that are displayed may not have a corresponding shorter autocomplete suggestion and/or a corresponding longer autocomplete suggestion in the listing.

Figure 5:
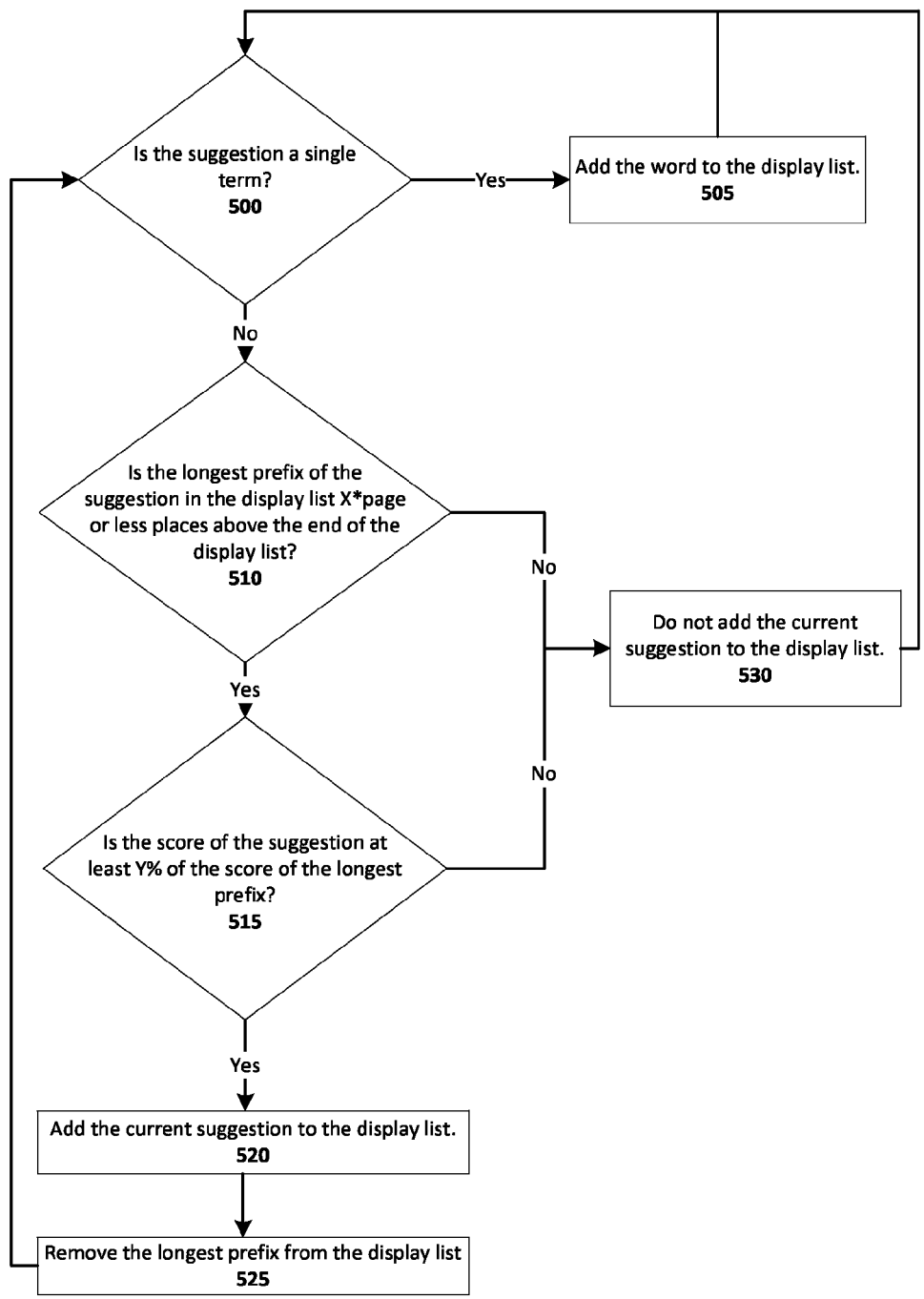
FIG. 5 is a flow chart illustrating another example method of determining which autocomplete suggestions to provide for display on a computing device.

Referring to FIG. 5, a flow chart illustrating another example method of determining which autocomplete suggestions to provide for display on a computing device is provided. Other implementations may perform the steps in a different order, omit certain steps, and/or perform different and/or additional steps than those illustrated in FIG. 5. For convenience, aspects of FIG. 5 will be described with reference to a system of one or more computers that perform the process. The system may include, for example, the autocomplete suggestion processing engine 120 of FIG. 1. In some implementations the steps of FIG. 5 may share one or more common aspects with one or more steps of FIG. 2 and/or FIG. 4.

The method of FIG. 5 may be iteratively applied to a listing of potential autocomplete suggestions provided in descending ranked order to identify a new listing of one or more sets of display data. As an example, the method of FIG. 5 will be described as being applied to the listing of potential autocomplete suggestions of FIG. 3C to identify which of those autocomplete suggestions to display on a computing device such as computing device 130 that can display four autocomplete suggestions simultaneously. For the example, the variable "X" is set at 0.75, the variable "page" is set at 4 and the variable "Y %" is set at 25%.

The first suggestion ("vacation") in the list of FIG. 3C is analyzed first. At step 500, it is determined whether "vacation" is a single term. The suggestion "vacation" in FIG. 3C is a single term and, as a result, the method proceeds to step 505, where the suggestion "vacation" is added to the display list of autocomplete suggestions to display.

The next suggestion ("video") in the list of FIG. 3C is analyzed next. At step 500, it is determined whether "video" is a single term. The suggestion "video" in FIG. 3C is a single term and, as a result, the method proceeds to step 505, where the suggestion "video" is added to the display list of autocomplete suggestions to display.

The next suggestion ("vacation destination") in the list of FIG. 3C is analyzed next. At step 500, it is determined whether "vacation destination" is a single term. The term "vacation destination" is not a single term and, as a result, the method proceeds to step 510, where it is determined if the longest prefix of the suggestion on the display list is ranked 3 (X*page) places or less above the end of the display list. The longest prefix of the suggestion "vacation destination" on the display list is "vacation" and it is ranked only 2 spaces above the end of the display list, which is not greater than 3. The method proceeds to step 515, where it is determined if "vacation destination" corresponds to at least 25% (Y %) of the score for "vacation". 33.3% (3.6/10.8) is greater than 25%. Accordingly, at step 520 "vacation destination" is added to the display list and, at step 525 the longest prefix "vacation" that was on the display list is removed from the display list.

The suggestion "vampire" of FIG. 3C is analyzed next. At step 500 it is determined whether "vampire" is a single word. The suggestion "vampire" in FIG. 3C is a single word and, as a result, the method proceeds to step 505, where the suggestion "vampire" is added to the display list of autocomplete suggestions to display.

The suggestion "vampire stories" in the list of FIG. 3C is analyzed next. At step 500, it is determined whether "vampire stories" is a single term. The term "vampire stories" is not a single term and, as a result, the method proceeds to step 510, where it is determined if the longest prefix of the suggestion on the display list is ranked 3 (X*page) places or less above the end of the display list. The longest prefix of the suggestion "vampire stories" on the display list is "vampire stories" and it is ranked only 1 space above the end of the display list, which is not greater than 3. The method proceeds to step 515, where it is determined if "vampire stories" corresponds to at least 25% (Y %) of the score for "vampire". 100% (3.5/3.5) is greater than 25%. Accordingly, at step 520 "vampire stories" is added to the display list and, at step 525 the longest prefix "vampire" that was on the display list is removed from the display list.

The suggestion "vineyard" of FIG. 3C is analyzed next. At step 500 it is determined whether "vineyard" is a single word. The suggestion "vineyard" in FIG. 3C is a single word and, as a result, the method proceeds to step 505, where the suggestion "vineyard" is added to the display list of autocomplete suggestions to display.

The suggestion "vacation search" in the list of FIG. 3C is analyzed next. At step 500, it is determined whether "vacation search" is a single term. The term "vacation search" is not a single term and, as a result, the method proceeds to step 510, where it is determined if the longest prefix of the suggestion on the display list is ranked 3 (X*page) places or less above the end of the display list. The suggestion "vacation search" does not have a longest prefix on the display list ("vacation" was removed by "vacation destination"). Accordingly, at step 530 the suggestion "vacation search" is not added to the display list and the method proceeds back to step 500.

The method continues to step through the list of FIG. 3C until it reaches the end of the list and a final display list is created. Continuing the example with the variable "X" set at 0.75, the variable "page" set at 4, and the variable "Y %" set at 25% would lead to a final display list that is ordered as follows: "video", "vacation destination", "vampire stories", "vacation search engines", "vineyard in napa", and "vineyard vacation in". In some implementations the first four of those may be provided to a computing device such as computing device 130 that can display four autocomplete suggestions simultaneously. The additional two autocomplete suggestions may be provided in response to a user request for additional autocomplete suggestions. Other of the autocomplete suggestions from the list of FIG. 3C that were not included in the display list may additionally and/or alternatively be provided in response to a user request for additional autocomplete suggestions. In some implementations a user request for additional autocomplete suggestions will initiate creation of an additional display list based on remaining autocomplete suggestions from the list of FIG. 3C that were not included in the display. In some implementations different selection criteria may be utilized for the additional display list.

Figure 6:
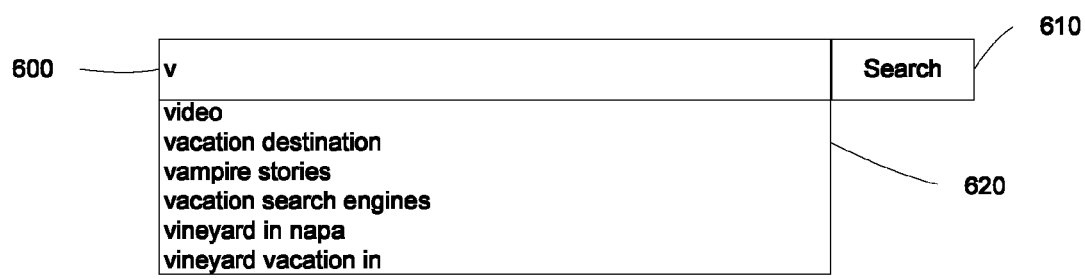
FIG. 6 illustrates a partial screenshot of an example environment that can be used to provide autocomplete suggestion results to a user.

FIG. 6 is a partial screenshot that illustrates an example environment that can be used to provide autocomplete suggestions to a user. In FIG. 6, the partial screen shot includes a search field representation 600 and a search button representation 610. In this example, the user has entered the partial query "v" into the search field representation and a drop down menu 620 of the search field is displayed. The drop down menu 620 includes the six autocomplete suggestions from the potential suggestions of FIG. 3C that were identified in the example discussed with FIG. 5 as being marked for display in the first display group. The user may optionally choose any of the autocomplete suggestions and utilize such suggestion as a completed query or the basis for a completed query to retrieve information based on the identified autocomplete suggestion. In some implementations the user may request additional display sets of autocomplete suggestions to be displayed. For example, in some implementations a user may scroll within the drop down menu 620 to display one or more additional autocomplete suggestions from further display sets.

Figure 7:
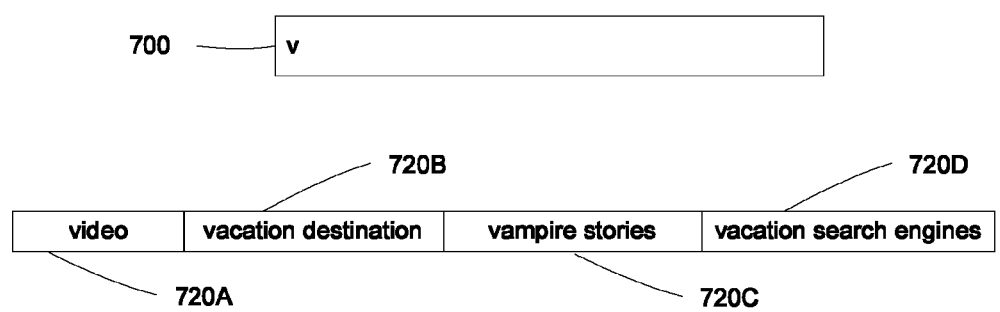
FIG. 7 illustrates another partial screenshot of an example environment that can be used to provide autocomplete suggestion results to a user.

FIG. 7 is a partial screenshot that illustrates an example environment that can be used to provide autocomplete suggestions to a user. In FIG. 7, the partial screen shot includes a text entry field representation 700. In this example, the user has entered the partial query "v" into the search field representation and four separately selectable cells 720A-D arranged in one row and three columns is displayed below the text entry field representation. The displayed autocomplete suggestions include the first four of the six autocomplete suggestions from the potential suggestions of FIG. 3C that were identified in the example discussed with FIG. 5 as being marked for display in the first display group. The user may optionally choose any of the autocomplete suggestions and utilize such suggestion as a completed query or the basis for a completed query to retrieve information based on the identified autocomplete suggestion. In some implementations the user may request additional display sets of autocomplete suggestions to be displayed. For example, in some implementations a user may swipe (e.g., a finger swipe gesture) in the user interface to display one or more additional autocomplete suggestions. Although specific displays autocomplete suggestion presentations are illustrated in FIGS. 6 and 7, one of ordinary skill in the art, having had the benefit of the present disclosure, will recognize and appreciate that additional and/or alternative displays may be provided.

Although methods of processing autocomplete suggestions for partial queries are illustrated in the Figures, one of ordinary skill in the art, having had the benefit of the present disclosure, will recognize and appreciate that the methods may additionally and/or alternatively be utilized to process autocomplete suggestions for a completed search query. Certain implementations of the methods of processing autocomplete suggestions have been described as taking place in a substantially real time environment. However, one of ordinary skill in the art, having had the benefit of the present disclosure, will recognize and appreciate that one or more aspects of methods described herein may be implemented in an offline mode. For example, implementations of methods described herein may be utilized to generate autocomplete suggestions, autocomplete scores, sort autocomplete suggestions, and/or determine autocomplete suggestions for supplying in response to a query that may be made available for utilization in a real time environment in processing autocomplete suggestions.

Figure 8:
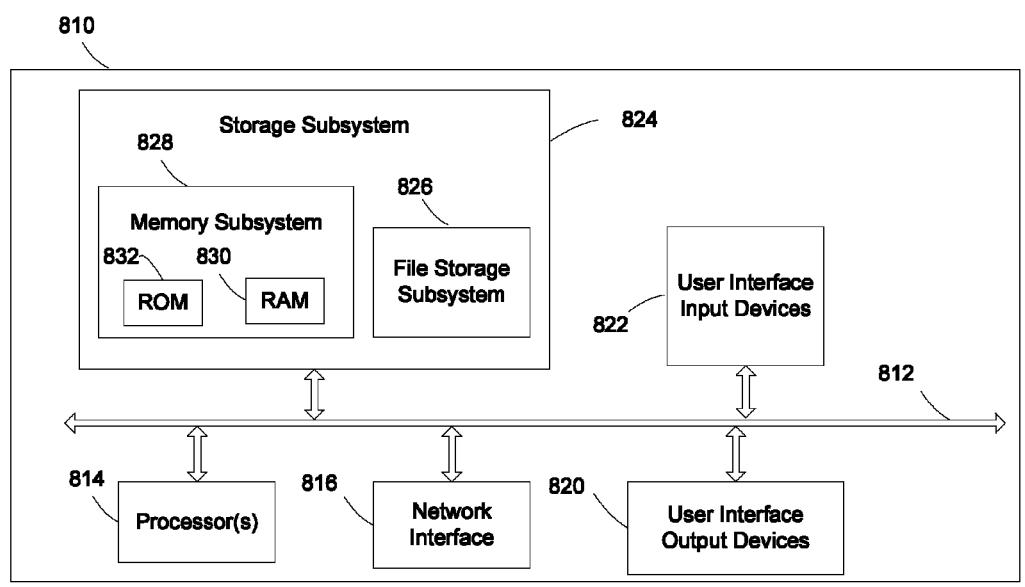
FIG. 8 illustrates a block diagram of an example computer system.

FIG. 8 is a block diagram of an example computer system 810. Computer system 810 typically includes at least one processor 814 which communicates with a number of peripheral devices via bus subsystem 812. These peripheral devices may include a storage subsystem 824, including, for example, a memory subsystem 828 and a file storage subsystem 826, user interface input devices 822, user interface output devices 820, and a network interface subsystem 816. The input and output devices allow user interaction with computer system 810. Network interface subsystem 816 provides an interface to outside networks and is coupled to corresponding interface devices in other computer systems.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules described herein. For example, the storage subsystem 824 may include the logic to process autocomplete suggestions according to one or more processes described herein.

These software modules are generally executed by processor 814 alone or in combination with other processors. Memory 828 used in the storage subsystem can include a number of memories including a main random access memory (RAM) 830 for storage of instructions and data during program execution and a read only memory (ROM) 832 in which fixed instructions are stored. A file storage subsystem 824 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 824 in the storage subsystem 824, or in other machines accessible by the processor(s) 814.

Bus subsystem 812 provides a mechanism for letting the various components and subsystems of computer system 810 communicate with each other as intended. Although bus subsystem 812 is shown schematically as a single bus, alternative implementations of the bus subsystem may use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as a specific example for purposes of illustrating some implementations. Many other configurations of computer system 810 are possible having more or fewer components than the computer system depicted in FIG. 8.

While several inventive implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive implementations described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over vocabulary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

What is claimed is:

1. A computer implemented method, comprising:
   identifying a query formulated via a computing device;
   identifying display information indicative of one or more display parameters of the computing device;
   identifying, based on the query, a plurality of autocomplete suggestions and corresponding scores, the autocomplete suggestions including at least one shorter autocomplete suggestion that is shorter in length than, and includes at least a first term of, one or more longer autocomplete suggestions of the autocomplete suggestions;
   determining a consolidated score of the shorter autocomplete suggestion, the consolidated score being a function of the score of the shorter autocomplete suggestion and one or more of the scores of the longer autocomplete suggestions that each include at least the first term; and
   determining a display group of the autocomplete suggestions for simultaneous display on the computing device;
   wherein determining the display group includes determining whether to include the shorter autocomplete suggestion in the display group based on comparison of the consolidated score of the shorter autocomplete suggestion to the scores of one or more of the longer autocomplete suggestions, and based on the display information.

2. The method of claim 1, wherein the display parameters include screen size and wherein the shorter autocomplete suggestion is more likely to be included in the display group when said display information indicates a smaller screen size than when said display information indicates a larger screen size.

3. The method of claim 1, wherein determining whether to include the shorter autocomplete suggestion in the display group is further based on a length parameter indicative of the length of the shorter autocomplete suggestion.

4. The method of claim 3, wherein determining whether to include the shorter autocomplete suggestion in the display group based on the length parameter includes comparing the length parameter to the display information.

5. The method of claim 3, wherein determining whether to include the shorter autocomplete suggestion in the display group based on the length parameter includes comparing the length parameter to one or more second length parameters each indicative of the length of one of the one or more longer autocomplete suggestions.

6. The method of claim 1, further comprising determining additional autocomplete suggestions of the autocomplete suggestions for display on the computing device following display of the display group.

7. The method of claim 6, wherein different selection criteria is utilized in determining the additional autocomplete suggestions than utilized in determining the display group.

8. The method of claim 7, wherein the different selection criteria increases the likelihood of selecting the one or more longer autocomplete suggestions.

9. The method of claim 6, further comprising providing the additional autocomplete suggestions for simultaneous display on the computing device as a second display group, the second display group displayed without simultaneous display of the display group.

10. The method of claim 1, wherein determining the display group includes selecting for inclusion in the display group only a single of: the shorter autocomplete suggestion and the one or more longer autocomplete suggestions.

11. The method of claim 1, wherein determining the display group includes determining to include a given longer autocomplete suggestion of the longer autocomplete suggestions in the display group in lieu of the shorter autocomplete suggestion based on the score of the given longer autocomplete suggestion being at least a threshold percentage of the consolidated score.

12. A system including memory and one or more processors operable to execute instructions stored in the memory, comprising instructions to:
   identify a query formulated via a computing device;
   identify display information indicative of one or more display parameters of the computing device;
   identify, based on the query, a plurality of autocomplete suggestions and corresponding scores, the autocomplete suggestions including at least one shorter autocomplete suggestion that is shorter in length than, and includes at least a first term of, one or more longer autocomplete suggestions of the autocomplete suggestions;
   determine a consolidated score of the shorter autocomplete suggestion, the consolidated score being a function of the score of the shorter autocomplete suggestion and one or more of the scores of the longer autocomplete suggestions that each include at least the first term; and determine a display group of the autocomplete suggestions for simultaneous display on the computing device;

wherein the instructions to determine the display group include instructions to determine whether to include the shorter autocomplete suggestion in the display group based on comparison of the consolidated score of the shorter autocomplete suggestion to the scores of one or more of the longer autocomplete suggestions, and based on the display information.

13. The system of claim 12, wherein the display parameters include screen size and wherein the shorter autocomplete suggestion is more likely to be included in the display group when said display information indicates a smaller screen size than when said display information indicates a larger screen size.

14. The system of claim 12, wherein the instructions to determine whether to include the shorter autocomplete suggestion in the display group further include instructions to determine whether to include the shorter autocomplete suggestion in the display group based on a length parameter indicative of the length of the shorter autocomplete suggestion.

15. The system of claim 14, wherein the instructions to determine whether to include the shorter autocomplete suggestion in the display group based on the length parameter include instructions to compare the length parameter to the display information.

16. The system of claim 14, wherein the instructions to determine whether to include the shorter autocomplete suggestion in the display group based on the length parameter include instructions to compare the length parameter to one or more second length parameters each indicative of the length of one of the one or more longer autocomplete suggestions.

17. The system of claim 12, wherein the instructions further include instructions to determine additional autocomplete suggestions of the autocomplete suggestions for display on the computing device following display of the display group.

18. The system of claim 17, wherein different selection criteria is utilized in the instructions to determine the additional autocomplete suggestions than utilized in the instructions to determine the display group.

19. The system of claim 18, wherein the different selection criteria increases the likelihood of selecting the one or more longer autocomplete suggestions.

20. The system of claim 12, further comprising instructions to provide the additional autocomplete suggestions for simultaneous display on the computing device as a second display group, the second display group displayed without simultaneous display of the display group.

21. The system of claim 12, wherein the instructions to determine the display group includes instructions to select for inclusion in the display group only a single of: the shorter autocomplete suggestion and the one or more longer autocomplete suggestions.

22. The system of claim 12, wherein the instructions to determine the display group include instructions to determine to include a given longer autocomplete suggestion of the longer autocomplete suggestions in the display group in lieu of the shorter autocomplete suggestion based on the score of the given longer autocomplete suggestion being at least a threshold percentage of the consolidated score.

23. A non-transitory computer readable storage medium storing instructions executable by a processor to perform a method comprising:

identifying a query formulated via a computing device;

identifying display information indicative of one or more display parameters of the computing device;

identifying, based on the query, a plurality of autocomplete suggestions and corresponding scores, the autocomplete suggestions including at least one shorter autocomplete suggestion that is shorter in length than, and includes at least a first term of, one or more longer autocomplete suggestions of the autocomplete suggestions;

determining a consolidated score of the shorter autocomplete suggestion, the consolidated score being a function of the score of the shorter autocomplete suggestion and one or more of the scores of the longer autocomplete suggestions that each include at least the first term; and determining a display group of the autocomplete suggestions for simultaneous display on the computing device;

wherein determining the display group includes determining whether to include the shorter autocomplete suggestion in the display group based on comparison of the consolidated score of the shorter autocomplete suggestion to the scores of one or more of the longer autocomplete suggestions, and based on the display information.

* * * * *